(12) United States Patent
Smith

(10) Patent No.: US 9,602,773 B1
(45) Date of Patent: Mar. 21, 2017

(54) AUDIOVISUAL CONFERENCING SYSTEM AND METHOD

(76) Inventor: Andre Smith, Los Angeles, CA (US)

( * ) Notice: Subject to any disclaimer, the term of this patent is extended or adjusted under 35 U.S.C. 154(b) by 1390 days.

(21) Appl. No.: 11/706,658

(22) Filed: Feb. 15, 2007

Related U.S. Application Data

(60) Provisional application No. 60/773,969, filed on Feb. 15, 2006.

(51) Int. Cl.
*H04M 3/42* (2006.01)
*G09G 5/00* (2006.01)
*H04N 7/173* (2011.01)

(52) U.S. Cl.
CPC .................................. *H04N 7/173* (2013.01)

(58) Field of Classification Search
USPC ............. 379/202.01, 204.01, 53–54; 348/15; 345/1.1–3.4
See application file for complete search history.

(56) References Cited

U.S. PATENT DOCUMENTS

| | | | |
|---|---|---|---|
| 4,760,527 A | 7/1988 | Sidley | |
| 5,382,972 A * | 1/1995 | Kannes | 348/14.07 |
| 5,884,272 A | 3/1999 | Walker | |
| 2002/0178163 A1 | 11/2002 | Mayer | |
| 2004/0128350 A1 * | 7/2004 | Topfl et al. | 709/204 |
| 2004/0233273 A1 * | 11/2004 | Ferren et al. | 348/14.08 |
| 2006/0028398 A1 * | 2/2006 | Willmore | 345/2.3 |
| 2006/0139449 A1 * | 6/2006 | Cheng et al. | 348/61 |
| 2007/0057866 A1 * | 3/2007 | Lee et al. | 345/1.1 |
| 2009/0102744 A1 * | 4/2009 | Ram | 345/1.1 |
| 2009/0292599 A1 * | 11/2009 | Rampell et al. | 705/14.13 |
| 2010/0085274 A1 * | 4/2010 | Kilpatrick et al. | 345/1.3 |
| 2010/0250345 A1 * | 9/2010 | Pratt et al. | 705/13 |

\* cited by examiner

*Primary Examiner* — Davetta W Goins
*Assistant Examiner* — Mohammad Islam
(74) *Attorney, Agent, or Firm* — Kenneth L Tolar

(57) ABSTRACT

An audiovisual conferencing system and method include a plurality of video monitors, video cameras and audio transducers positioned within a home club. Each of the components is connected to a computer controller and broadband interne router so as to be in selective communication with one of a plurality of similar remote systems positioned within another club. Accordingly, patrons of the home club can visually and audibly communicate with patrons of a remote club via the interne.

7 Claims, 1 Drawing Sheet

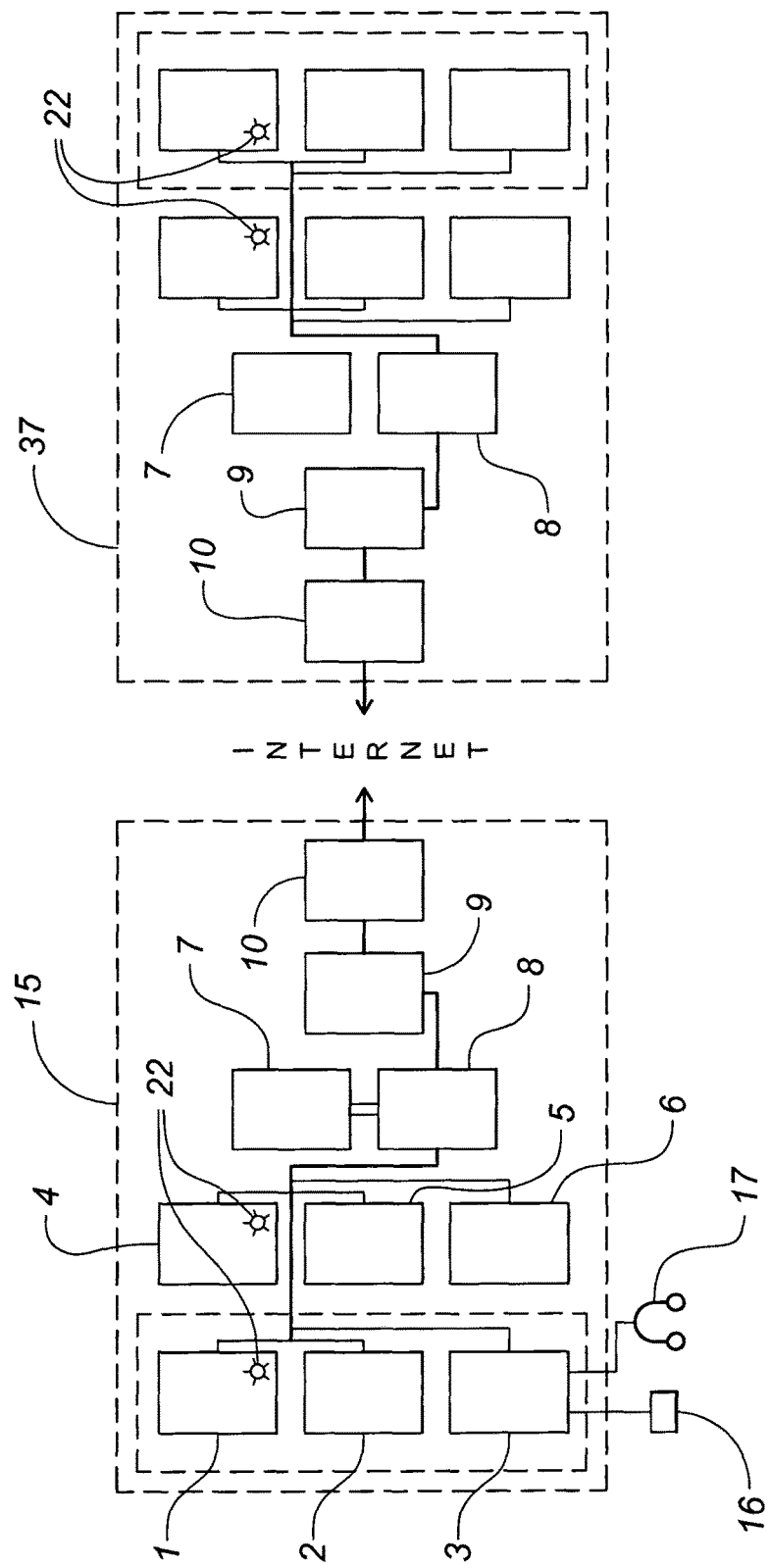

AUDIOVISUAL CONFERENCING SYSTEM AND METHOD

CROSS REFERENCE TO RELATED APPLICATIONS

This application is entitled to the benefit of provisional application No. 60/773,969 filed on Feb. 15, 2006, the specification of which is incorporated herein by reference.

BACKGROUND OF THE INVENTION

The present invention relates to a conferencing system and method that allow club patrons to visually and audibly interact with other club patrons at a remote location.

DESCRIPTION OF THE PRIOR ART

Virtually every country in the world has nightclubs or similar public fora where people gather to socialize, listen to music or engage in other similar activity. Nightclubs within a particular geographical location, i.e., a state or country, typically have their own unique culture, customs and types of people. Those living within a particular geographical region who wish to experience clubs in other regions and countries must travel to such areas, which is time consuming and expensive. Accordingly, there is currently a need for a system that allows club patrons to experience clubs in other regions without incurring the financial and time expenditures required to travel to such areas.

Various audiovisual communications systems exist in the prior art. For example, U.S. Pat. No. 5,884,272 issued to Walker et al. discloses a method for establishing anonymous communications. U.S. Pat. No. 4,760,527 issued to Sidley discloses an electronic system for playing a card game. U.S. published patent application no. 2002/0178163 filed on behalf of Mayer discloses a system and method for searching, finding and contacting dates on the internet.

The present invention differs from the systems disclosed in the prior art by providing a uniquely designed audiovisual conferencing system that allows club patrons worldwide to interact with other remote club patrons without leaving their home club.

SUMMARY OF THE INVENTION

The present invention relates to an audiovisual conferencing system and method including a plurality of video monitors, video cameras and audio transducers positioned within a home club. Each of the components is connected to a computer controller and broadband internet router so as to be in selective communication with one of plurality of similar remote systems positioned within another club. Accordingly, patrons of the home club can visually and audibly communicate with patrons of a remote club via the internet.

It is therefore an object of the present invention to provide an audiovisual conferencing system that allows people worldwide to interact in a desired forum and location.

It is another object of the present invention to provide an audiovisual communication system that allows patrons of a designated club to become immersed within remote cultures from the convenience of a home club.

Other objects, features, and advantages of the present invention will become readily apparent from the following detailed description of the preferred embodiment when considered with the attached drawings and the appended claims.

BRIEF DESCRIPTION OF THE DRAWINGS

FIG. 1 depicts the various audiovisual components of a home club and those of a corresponding remote club in communication therewith.

DESCRIPTION OF THE PREFERRED EMBODIMENT

The present invention relates to an audiovisual conferencing system and method. The system includes an individual patron display panel 1 that is strategically positioned within a home club 15, i.e., on a wall, in a designated booth or in a similar location. An individual patron video camera 2 with audio capability is positioned proximal the individual patron display and is aimed at a club member or perhaps the entire club room. An individual patron audio system 3 includes a plurality of speakers strategically positioned to provide audio corresponding to the video displayed on the individual patron display panel. The audio system could be privatized by including a boom microphone 16 and earphones 17 to allow the individual patron to engage in a private conversation.

The system further includes a group display panel 4 comprised of a plurality of flat display screens that operate in parallel to show a larger image, i.e., the entire interior of a remote club 37, described, infra. Alternatively, the group display panel can be a single, large display screen. A group video camera 5 with audio capability is aimed at a slightly larger group of home club members or the entire home club room interior. The system further includes a group audio system 6 including a plurality of speakers located near the group display for receiving input from the group display or other selected displays within the room. A light 22 on each display is illuminated whenever its audio output is being fed to the audio system.

The system further includes a human operator, i.e., an audiovisual jockey 7, that coordinates the audiovisual feed from the individual booths or units and transmits such data to remote clubs. The audiovisual jockey uses an audiovisual control board 8 to selectively transmit and display the appropriate data. The jockey also uses a computer control 9 to execute various commands and to engage a broadband internet router 10, which receives audiovisual information from and transmits audiovisual information to remote clubs via the internet. The computer controller can switch between any connected audio and visual components allowing an operator to isolate or combine the audio and video components.

The audiovisual conferencing method according to the present invention includes installing the above-described system in two or more club venues within any geographical location in the world. The audio and video components of each club are in direct communication with corresponding components within other clubs via the internet. Information flowing between remote clubs can be unencrypted for normal business and entertainment applications or encrypted for confidential business applications. The owner of a specific club can sell advertising on the larger group display or on the individual patron displays to finance the system's installation, maintenance and operation. If necessary, translation services can be supplied to facilitate conversations between two or more ethnic groups who do not share a common language. Furthermore, an individual patron will be given the option to log on from a home computer using a secured identification password for which the user pays a fee. Otherwise, club patrons are charged entrance fees to access the club and its associated audiovisual system. Preferably, each of the individual patron audio and visual components is contained within a designated booth or station for privacy.

The above-described system and method allow communications between club patrons in one locale and similar club patrons in another locale, regardless of the distance therebetween. Accordingly, such club patrons can quickly and conveniently become immersed in other cultures via the interne. Bidirectional communications can be established electronically for a fraction of the travel costs that would otherwise be necessary to commingle such cultures.

The above-described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An audiovisual conferencing system comprising:
   a base individual-patron display panel positioned within a home club;
   a base individual-patron video camera with audio capability positioned proximal the base individual-patron display;
   a base individual-patron audio system positioned within said home club to provide audio related to video displayed on the base individual-patron display panel;
   a remote individual-patron display panel positioned within a remote club;
   a remote individual-patron video camera with audio capability positioned proximal the individual patron remote display;
   a remote individual-patron audio system positioned within said remote club to provide audio related to video displayed on the remote individual-patron display panel;
   means for establishing bidirectional communication between said base individual-patron display, said base individual-patron video camera, said base individual-patron audio system and said remote individual-patron display panel, said remote individual-patron video camera and said remote individual-patron audio system;
   a base group display panel positioned within said home club;
   a base group video camera with audio capability positioned within said home club, said base group video camera positioned and aimed to capture a larger area than said base individual-patron camera;
   a base group audio system including a plurality of speakers located near the base group display panel to provide audio related to video displayed on the base group display panel;
   a remote group display panel positioned within a remote club;
   a remote group video camera with audio capability positioned within said remote club, said remote group video camera positioned and aimed to capture a larger area than said remote individual-patron camera;
   a remote group audio system including a plurality of speakers located near the remote group display panel to provide audio related to video displayed on the remote group display panel a base audiovisual controller and a base computer connected to each of said base individual-patron and group display panels, audio systems, cameras, and a remote audiovisual controller and a remote computer connected to each of said remote individual-patron and group display panels, audio systems, cameras; wherein
   the said base controllers and base computers allow a human operator to coordinate audiovisual feed from the base individual-patron cameras and to transmit such data to the remote display panels and remote audio systems;
   and wherein the remote controllers and computers allow a human operator to coordinate audiovisual feed from the remote individual-patron cameras and to transmit such data to the base display panels and base audio systems.

2. The system according to claim 1 wherein said means for establishing bidirectional communication comprises an internet router.

3. The system according to claim 2 any of said audio systems includes a boom microphone and earphones to allow a user to engage in a private conversation.

4. The system according to claim 3 wherein said group display panel further includes plurality of flat display screens that operate in parallel to show a larger image.

5. The system according to claim 4 wherein each of said display panels includes a light that is illuminated whenever audio output emanating therefrom is being fed to one of said the audio systems.

6. The system according to claim 5 wherein said base individual-patron display panel, said base individual-patron video camera and said base individual-patron audio system are each positioned within a designated booth for privacy.

7. The system according to claim 6 wherein said remote individual-patron display panel, said remote individual-patron video camera and said remote individual-patron audio system are each positioned within a designated booth for privacy.

* * * * *